Dec. 20, 1960  C. J. LOECHL  2,965,528
GYPSUM BOARD
Filed Nov. 9, 1955
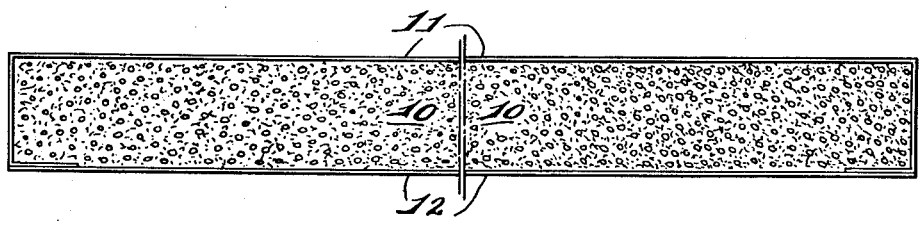
Inventor.
Clarence J. Loechl.
By. Edw. A. Hampson.
Attorney.

United States Patent Office 2,965,528
Patented Dec. 20, 1960

2,965,528
GYPSUM BOARD

Clarence J. Loechl, Arlington Heights, Ill., assignor to The Celotex Corporation, Chicago, Ill., a corporation of Delaware Filed Nov. 9, 1955, Ser. No. 552,677
11 Claims. (Cl. 154—88)

This invention relates to the manufacture of a new and improved gypsum wallboard including, of course, the new and improved gypsum wallboard due to the use of the inventions hereof, as will be disclosed and described.

This new and improved gypsum wallboard is of the class ordinarily referred to as "light weight gypsum board" which actually is so much lighter than the boards now considered as light weight boards that it is in a class by itself since, so far as is known, there is no other presently known method of manufacturing a commercial gypsum wallboard which even approaches the light weight of the products of the inventions disclosed.

Originally, gypsum wallboards comprised merely a set gypsum mass between paper facings. This product was heavy, and due to its weight it was difficult to handle and, of course, relatively expensive to ship. Without going through the intervening developments, this originally heavy gypsum wallboard has evolved into an appreciably lighter weight product in which the lighter weight is obtained by incorporating in the gypsum core an amount of air which is incorporated by the addition of foam to the mix from which the core is formed, or, in some instances, through the addition of a surface tension reducing agent whereby, in the mixing, bubbles are incorporated in the mixture which is formed as the core of the board. Such product is now what might be termed the "standard product" of the gypsum wallboard industry since, so far as is known, all gypsum wallboard in the market is made by such general manufacturing procedure.

Efforts have been made to further lighten the gypsum wallboard products through incorporating a larger amount of foam into the mix from which the core is formed, or by increasing the amount of water used in the gypsum slurry from which the core is formed, and probably through other procedures, but apparently little can be accomplished in such direction since an appreciable increase of foam in the mix, while it does bring about a reduction in the weight of the core, has the adverse effect of producing board which, in the art, is termed a "splitter," that is, gypsum wallboard in which the core portion and the paper facing sheets are not securely bonded. In many cases there is no bond at all between the core and the facing sheet or, in the best of these very light weight boards, there is some bond between the cover sheet and the core, but it is so imperfect that if the cover sheet is loosened from the core at some point a slight pull will separate the entire facing sheet from the core without in any way tearing the facing sheet apart. That is, none of it is left on the core, and in many cases the mere handling of board of this character will cause an entire face sheet to become loose.

As distinguished from these splitter sheets just referred to, a satisfactory commercial gypsum wallboard does not show this splitting but instead, if a corner of the cover sheet is loosened and is then pulled from the core, there will be found that it peels off only by splitting within the laminations of the cover sheet, and that a layer of the cover sheet will remain firmly bonded to the gypsum core.

The so-called "foam" boards, that is, gypsum wallboard manufactured by the incorporation of foam in the core mix, and including possibly some made by the equivalent addition of a surface tension reducing agent to the core mix, representing the products of all gypsum wallboards as now manufactured, average for wallboard of one-half inch thickness approximately 2125 lbs. per thousand square feet in weight. Gypsum wallboard made without the inclusion of voids or air cells resulting from the use of foam, or old style solid gypsum core wallboards, weighed about 2600 lbs. per thousand square feet for one-half inch thickness, so that it will be seen that the present commercial so-called "foam" boards are approximately 400 lbs. lighter per thousand square feet. As mentioned above, such reduction is just about all that can be obtained commercially, since in commercial manufacture of the product it is necessary that the board as manufactured be somewhat heavier than the absolute minimum weight board which can be made following the foam addition procedure. This is necessary due to the fact that the commercial boards must be good boards, and to be assured of such it is necessary as a safety factor that production weight be kept enough higher than absolute minimum weight so that there will be no danger of splitting in the production of commercial board.

As referred to, the weight of foam board can be lightened somewhat by the incorporation of more foam or of more water added to the mix from which the boards are formed, but practically the weight reduction which can be obtained in this manner is very slight. Any effort made to obtain an appreciable reduction in weight of the foam board through the addition of a greater amount of foam to the core mix will result in splitters. It has been found that using foam added to the core mix as the lightening agent, about the minimum weight which can be obtained for ½" board, without consistently producing splitter board, is just about 1800 lbs. per thousand square feet. Due to normal variations of gypsum stucco and conditions of manufacture, it might well be that splitters will be produced at such weight, but generally speaking, if the various conditions of manufacture are just right it would be theoretically possible, through exact control, which, however, is unattainable, to make a board which is one-half inch thick and weighs 1800 lbs. per thousand square feet. Commercially, board of this weight is impractical due to the natural variation of the properties of the gypsum stucco, through either variation of the original gypsum rock or variation in calcining, grinding, or the like, and to other variations which are normal to the ordinary procedures of the manufacture of gypsum wallboard.

Theoretically, reduction of board weight can be obtained by an increase of the water content of the mix, but this is impractical in commercial manufacture since the gypsum stucco mix, in producing the present commercial board, is about as thin as can be handled on the board-forming machine. The gypsum stucco slurry is discharged onto one of the facing sheets where it is spread out and leveled and the other facing sheet is applied, and if the slurry as placed on the bottom sheet is too thin it cannot be handled on the machine in producing the board.

Reduction of weight, also theoretically, can be obtained by increasing both the amount of foam and water addition to the mix in forming the gypsum stucco slurry for the core, but this has the disadvantage of each of the independent additions of additional foam or additional water, and attempts to decrease weight by the addition of both foam and water results in unsatisfactory board, producing both splitters and board of decreased and unsatisfactory strength.

In connection with the foregoing, in referring to the addition of foam to the gypsum stucco mix for obtaining reduction of weight, it is to be understood that the actual amount of foam added to the mix may vary quite considerably, particularly as regards different manufacturers or different plants, or even in a plant there may be quite a variation from time to time in the volume of foam as added, since it is not the volume of foam which is added that determines the weight of the finished gypsum board, but instead it is the volume of effective foam which determines the weight. The foam when added to the gypsum mix always breaks down to a certain extent during the mixing operation, and some foams, of course, will break down very appreciably as compared with other foams and therefore it is the volume of the foam which is not broken down during the mixing operation which is the effective foam volume which serves to decrease the weight of the finished gypsum board in which it has been incorporated.

In connection with various formulas which will be given herein, it is to be understood that such are typical or average but that, as above indicated, there is no fixed formula. In every case the calcined gypsum or stucco ingredient will vary slightly, and it will accordingly be necessary that as in particular the consistency of the gypsum stucco varies, that is the measure of its water requirement, that suitable variation of amounts of water added must be made. Due to the various circumstances, the quality of foam to be added will vary somewhat from time to time so that the effective foam incorporated in the mix will vary, and according to the variation of foam quality it will be necessary that the amount of foam added be suitably varied so as to obtain in the mix the proper amount of effective foam. Likewise other variations will occur as, for example, the accelerator quality may vary slightly and it will be necessary to make a slight adjustment in the amount of accelerator, or other accelerators may be used in equivalent amounts, or, due to the nature of the gypsum stucco, it may be required that the accelerator be somewhat increased or decreased in amount.

From the immediately foregoing it will be understood that the formulas as given are those which, in the usual procedure of producing gypsum wallboard produced of average materials and by ordinary procedures, will produce boards of what might be termed "average" quality, and that by slight variations and adjustments of quantities and qualities those skilled in the art can be expected to produce entirely satisfactory gypsum wallboards following such formulas.

In general, however, it can be said that satisfactory commercial board will average very close to the average figure as given, although generally board which is commercially satisfactory will not vary more than at the most about ten percent from the average given, and preferably should be maintained within about five percent of the average figure to assure a satisfactory product.

In the accompanying drawing, the figure is an end elevation of a gypsum wallboard.

The drawing is representative of a gypsum wallboard comprising a cellular core portion 10 with a front paper face sheet 11 and back paper face sheet 12.

An attempt has been made to indicate the core 10 as highly cellular, but it is to be understood that such showing is merely indicative since the actual cellular structure is specifically incapable of representation.

It is the principal object of this invention to provide a new and novel formulation for the manufacture of gypsum core wallboard to result in a commercially satisfactory product at weights which cannot be satisfactorily obtained by the use of the formulations which have heretofore been utilized in the manufacture of commercially satisfactory board. It is a further object hereof to provide a gypsum core wallboard which is in a weight range entirely outside and below the weight range within which heretofore it has been possible to manufacture commercially satisfactory board. Other objectives hereof are those of producing a gypsum core wallboard which, because of its lower weight, results in a saving in transportation of the product and which, in connection with its manufacture, shipment, and use, is more readily handled and can be manufactured at a lower cost than the present cost of gypsum core wallboards as now generally manufactured.

Still other and further objects of the inventions hereof are disclosed in and will be apparent upon reading the following description, which objectives are in addition to those just heretofore specifically stated.

Briefly stated, the general subject matter of the invention hereof is the formulation of a gypsum core mix which may be formed as the core of a paper faced gypsum wallboard, in which the reduction in weight of the core portion is obtained through the inclusion of a monogalactomannan in the formulation which constitutes the board core. It is to be understood, of course, that the principles of this invention apply particularly to the core material, that is, the set gypsum which is encased in paper facings in the production of gypsum wallboard, and that such core material may be utilized otherwise than as the core of gypsum wallboard. It may be cast into desired form or conceivably it may be utilized in plastering and the like, and in any such other use the advantage of lower density, or conversely of increased volume resulting, would be realized.

The specific galactomannan which has been found to produce the desired result is guar gum, and an entirely satisfactory product is available in the market as "Jaguar Gum A–20–D," the product of Stein Hall & Co., Inc. This guar gum product is rather highly refined and is substantially pure guar gum, and for the purposes hereof such property is ascribed to the product.

It has been determined that locust bean gum may also be used to achieve the results which are obtained by the use of guar gum, but locust bean gum, as available, is itself unsatisfactory. It has been determined that cooked locust bean gum may be substituted almost interchangeably with guar gum in achieving the results of the inventions hereof, but as will appear hereinafter, when using cooked locust bean gum in lieu of guar gum, to obtain the same result, slightly more locust bean gum must be used to produce the results obtained by the use of a given amount of guar gum. The cooked locust bean gum is such gum which has been dissolved in water and brought to the boiling point, preferably boiling for a short time to assure that all the solution has definitely been raised to the boiling point.

To illustrate the improvement, that is, the decrease in weight which can be obtained by the use of the inventions hereof, reference is made to the following table in which figures for one-half inch gypsum core wallboard are given. In the first following tabulation, the first line, "Neat" shown the average weight of gypsum wallboard made without any addition of foam, or any other agent or agency tending to produce a wallboard of lighter weight than the produced merely by the mixing and casting of a straight gypsum slurry. In the second line there is given the average weight of the gypsum wallboards on the market as produced by the various manufacturers through the incorporation of foam or other weight-reducing procedures of manufacture. In the third line the weight given is that at which using the procedures now utilized in producing commercial gypsum wallboard, the board product resulting will be what is termed in the art as "splitters," that is, when the formulation is varied through suitable adjustment of the ingredients with increase in the amount of water added and/or foam or other lightening agent, the resulting core fails to bond to the cover sheets and accordingly the board produced at or about at such weight is unsuitable for use, unsalable, and is nothing more than waste.

| ½" gypsum core wallboard: | Weight, lbs./1000 square feet |
| --- | --- |
| Neat gypsum core | 2620 |
| Average commercial board | 2120 |
| Weight at which bond fails—splitters | 1780 |

The results obtained by the incorporation of a content of guar gum into the gypsum core mixture are set out below with explanation of the various columns of the tabulation given below the tabulation as "Notes" identified according to the numerical headings of the respective columns of the tabulation.

[½" gypsum core board with guar gum]

| Column 1 | Column 2 | Column 3 |
|---|---|---|
| 0.125 | 1845 | 1680 |
| 0.25 | 1600 | 1450 |
| 0.46 | 1380 | 1130 |
| 0.5 | 1305 | 1080 |

1. Percent guar gum by weight based on gypsum stucco.
2. Weight at which satisfactory commercial board can be produced, pounds per 1000 square feet.
3. Weight per 1000 square feet at which the board produced will show failure as "splitters," paper facings not bonded.

As a basis of comparison, to clearly illustrate the advantage resulting from the utilization of the inventions hereof, there follows a comparative tabulation of the ingredients for producing, (1) a neat gypsum core wallboard, (2) average present-day light weight wallboard, and (3) the super light weight wallboard resulting from the utilization of the invention herein disclosed. In the tabulations below the water ingredient is not included since water is added to each formulation to result in a slurry of proper consistency, that is, one which can be satisfactorily discharged from the slurry mixers, and has sufficient body so that it does not freely flow off the bottom cover sheet to which it is applied and yet which can be readily spread over the entire bottom sheet so that the wallboard may be properly formed. Generally the amount of water to be added will be in the approximate amount of the weight of stucco, but depending upon the particular source of the gypsum rock and its processing, the water to be added may vary within the range of, say, from about 65 to about 120% of the weight of the gypsum stucco. Those skilled in the art, and particularly those engaged in the manufacture of gypsum wallboard, will know, according to the quality of the gypsum stucco being used, approximately the amount of water necessary to be added, and will understand from the way in which the mixed slurry acts when discharged on the bottom sheet whether the content of water should be somewhat increased or decreased in order to have a properly handleable slurry.

So that the formulations given will be directly comparable they are based on identical amounts of the common ingredients so that the variations in results obtained are shown by the tabulated variations of weight per cubic foot of core, weight per thousand square foot of board, and square foot of board which will be produced.

| Core Composition | Dry Core, lbs./cu. ft. | ½" Board, lbs./1,000 sq. ft. | Sq. Ft. of Board/1,000 lbs. Stucco |
|---|---|---|---|
| ½" Board Neat Gypsum Core: 1,000 lbs. Stucco 10 lbs. Paper Fiber 8 lbs. Starch 4 lbs. Accelerator | 65 | 2,620 | 405 |
| ½" Commercial Light Weight Core: 1,000 lbs. Stucco 10 lbs. Paper Fiber 8 lbs. Starch 4 lbs. Accelerator 1 lb. Rosin Soap Foam [1] | 51 | 2,090 | 515 |
| ½" Super Light Gypsum Board: 1,000 lbs. Stucco 10 lbs. Paper Fiber 8 lbs. Starch 4 lbs. Accelerator 4 lbs. Guar Gum 2 lbs. Rosin Soap Foam [1] | 27 | 1,555 | 710 |

[1] The amount of rosin soap foam as given is the actual weight of rosin soap used and which, for use, is dissolved in water at 1½% concentration and then suitably beaten or foamed to result in a foam having a weight of 12 lbs. per cubic foot. This results in approximately five to six cubic feet of foam per pound of rosin soap.

For the paper fiber ingredient of the foregoing formulas there may be substituted as an equivalent, one pound of fine glass fiber, preferably that usually referred to as "textile glass" fiber which, for this use, is chopped or otherwise divided to provide fiber of about one-half inch length.

For the rosin soap ingredient in the foregoing there may be substituted as an equivalent for one pound of rosin soap, 0.1% of Ultrawet DS or 0.1% Nacconol NR, surface active agents, the Ultrawet being an aromatic sodium sulfonate product of the Atlantic Refining Company, and the Nacconol a sodium alkyl aryl sulfonate product of National Aniline & Chemical Company.

The accelerator is that well-known to those skilled in the art and substantially universally used in the plants manufacturing gypsum wallboard. To those skilled in the art, the accelerator is a mixture of ground block and alum in varying proportions, generally about two parts of ground block to one part of alum. The portion of the composition commonly referred to as "alum" is not in fact alum but actually potassium sulphate, $K_2SO_4$. Ground block is calcined gypsum which has been mixed up with water and formed as a set gypsum block and which is freshly ground on an emery wheel, although it is understood that in some plants the material of the block is reduced to the desired finely divided form by some type of a pulverizer instead of by grinding on an emery wheel. The accelerator is not compounded and stored for use but is freshly prepared with as little intervening time interval as possible between its preparation and introduction into the gypsum slurry which constitutes the core in the manufacture of gypsum wallboard.

In connection with the foregoing formulations, the actual effect resulting from the use of the inventions hereof is most definitely shown by the figures in the column "Dry core, lbs./cu. ft." above. These figures are those of the actual weight of the gypsum core and reflect the full effect of the weight reduction which is obtained. The figures appearing under the column "½" Board lbs./1000 sq. ft." do not fully reflect the decrease in core weight that is obtained since in each of these figures there is included the weight of the cover sheets, approximately 150 pounds, which weight is constant regardless of the core formulation.

The column "Sq.ft. of board/1000 lbs. stucco" clearly illustrates the great advantage which is obtained by the utilization of the inventions hereof, and this shows that according to the "Super light" formulation, according to the disclosure hereof 1000 lbs. of gypsum stucco produces about twice as much board as that having a neat gypsum core, and approximately one-half as much again board as one having a light weight core according to current general manufacturing processes.

Attention is again directed to the fact that in connection with the above formulation for "Super light" weight board, cooked locust bean gum can be substituted in an approximate equal amount for the guar gum ingredient. Following there is given a tabulation to show the amount of weight reduction of core obtained for different thicknesses of wallboard using different percentages of guar gum additive. In connection with these tabulations there are given figures for the same thickness of board having cores, respectively, of neat gypsum, average commercial production, and the weight at which current commercially produced board can be expected to result in "splitters" and which, while lower than safe commercial production weight, can be taken as the very minimum weight at which usable board can be produced by presently generally usual practices. These figures just referred to will be in pounds per thousand square feet, identified as "Neat," "Production" and "Splitters."

[¼" Thickness]

| Without Gum | | With Gum | |
|---|---|---|---|
| | | Percent Guar | Good Board, Pounds |
| Neat | 1,200 | .25 | 831 |
| Production | 1,090 | .30 | 792 |
| Splitters | 900 | | |

[⅜" Thickness]

| | | | |
|---|---|---|---|
| Neat | 1,900 | .25 | 1,330 |
| Production | 1,525 | .4 | 1,300 |
| Splitters | 1,400 | .46 | 1,178 |
| | | .50 | ¹1,250 |

[½" Thickness]

| | | | |
|---|---|---|---|
| Neat | 2,620 | .125 | 1,845 |
| Production | 2,120 | .25 | 1,600 |
| Splitters | 1,780 | .46 | 1,380 |
| | | .5 | 1,305 |

[⅝" Thickness]

| | | | |
|---|---|---|---|
| Neat | 3,000 | .25 | 2,030 |
| Production | 2,650 | .46 | 1,800 |
| Splitters | 2,300 | .5 | 1,790 |

¹ This was an actual mill production run where weight per thousand was purposely maintained somewhat higher than the minimum weight at which good board could be expected to be produced.

From the foregoing it should be readily apparent that with the use of guar gum in the core formulation, as has been particularly pointed out and described, board weights appreciably under present commercially average production weights are obtained. In particular, attention is directed to the figures with reference to an actual production run which, as compared with the present ⅜" average commercial production weight of 1525 lbs. per thousand square feet, board produced by the incorporation of 0.5% guar gum was approximately 300 pounds per thousand square feet lighter.

In connection with the substitution of cooked locust bean gum for guar gum in the core formula, good ⅝" board was produced with 0.25% cooked locust bean gum in the core formulation weighing 2200 lbs. per thousand square feet. Comparing with the above tabulation for ⅝" commercial production board of 2650 lbs. per thousand square feet, it will be seen that a weight reduction of about 450 lbs. was obtained. With uncooked locust bean gum incorporated up to two percent in the core formulation it was not possible to produce good board at or below 2200 lbs. per thousand square feet, the weight of good board produced using 0.25% cooked locust bean gum. On increasing the cooked locust bean gum incorporated in the core formulation to 0.5%, good board of 1920 lbs. per thousand square feet was made which, although not quite as good as ⅝" board made with 0.5% guar gum in the formulation, is within the general range. From other work which has been done in connection with substituting cooked locust bean gum for guar gum it is believed that it would be possible to increase the amount of foam added to the core mix to produce good ⅝" board using 0.5% locust bean gum having a weight of 1800 lbs. per thousand square feet.

With the thought that possibly other gums would more or less produce the same result as obtained with guar gum and cooked locust bean gum, as above particularly described, experiments were made with other gums to determine whether by the substitution of them in the core formulation they would produce the same board weight-reducing results as good board, that is, without producing "splitters" which, as pointed out heretofore, results according to present gypsum board production practices when an attempt is made to appreciably reduce weight below current average production weights as heretofore set out.

In connection with determining the suitability of the substitution of gums, the following determinations were made following the core formulations as heretofore set out but substituting other gums for the guar gum ingredient.

Substituting gum karaya for the guar gum in amounts from 0.46 to 3.0% it was not possible to make good board equivalent to the ⅝" board having 0.25% guar gum in the core formulation.

Substituting gum tragacanth, as above, in amounts from 0.46% to 1% in the core formulation it was not possible to make good board equivalent to the ⅝" board produced using 0.25% guar gum. At 1% substitution, board weighing 2040 lbs. per thousand square feet was bad in that the face sheets were not adhered, that is, the boards produced were splitters. Substituting gum arabic in the formulation in amounts of 0.46 to 3%, the results were the same as those of the substitution just referred to, that is, it was not possible to get down to a board weight of 2030 lbs. per thousand square feet without resulting in splitters.

It is believed clearly evident, considering the results obtained in experiments with gum substitutions, as just above referred to, that the results obtained by the incorporation of guar gum and cooked locust bean gum are specific and that like results are not obtained by the substitution therefor of other more or less common available gums.

It has not been possible up to this time to determine the exact physical or chemical actions which produce the new and novel results which have been described and which provide for the production of good gypsum wallboards at weights appreciably below the weight of average presently commercially produced gypsum wallboards, and in fact provide for the production of good gypsum wallboard at weights below the weights at which splitters are encountered in accordance with the present procedures of production of gypsum wallboards.

Merely as a theory, it is believed that the guar gum and cooked locust bean gum in the core formulations act as dispersing agents, since in the mixing of the core formula the slurry has a very smooth and unctuous appearance which may be considered more or less comparable with the appearance of thick cream. This appearance of the slurry while it is being mixed is different and can be readily distinguished from a slurry made according to present general gypsum board production procedures according to the formula above given and titled, "Commercial Light Weight Core." This commercial slurry formulation, while not lumpy, has an appearance which can be described only as a "seeming lumpiness," and it is more watery than oily in appearance. This difference in appearance of the slurries would seem to indicate that the gypsum in the slurry is dispersed much more completely when the guar gum or cooked locust bean gum is included. The inclusion of these gums also seems to have some effect in stabilizing or maintaining the foam cells which are added in accordance with the slurry formulation given.

In viewing commercial board and board made in accordance with the inventions hereof under relatively high magnification, the board hereof very definitely is of more regular cellularity, which is more uniformly dispersed throughout the gypsum matrix, and in addition the commercial formulation board will be found to have numerous large cells which, in general, are larger and present in appreciably greater number than can be found in board made in accordance with the inventions hereof. It may be that with further investigation the specific action of the guar gum and cooked locust bean gum in the formulation can be determined, but since the formulations and procedures for the utilizations of the inventions hereof have been above fully set out, it is not felt that for the purpose of this specification it is essential that the physical or chemical phenomena producing the results be known.

To determine the effect on strength of board of lower weight, and resulting from the applications of the inventions hereof, test cubes were cast and tested in compression. In connection with these tests, since the cover sheet of all gypsum wallboard is substantially constant at 150 lbs. per thousand square feet of board, the core weight is approximately 150 lbs. less than board weight. These tests were made particularly with respect to board weights for ½" gypsum wallboard, one set of test cubes being made up of gypsum compositions according to the generally present practices of manufacture, as heretofore referred to. The other set of test cubes was made up in accordance with the inventions hereof incorporating guar gum, and curves were plotted from the results of compression tests made on these two sets of test cubes. From these curves there will be tabulated below the relative strengths of the gypsum casts for several different weights, and such will be seen to show that for like weights the strength of the specimens incorporating the guar gum content range from about one and one-half times to nearly twice the strength of those not incorporating guar gum.

In connection with these figures and the tabulation, it is understood, of course, that the weights were varied by reducing the amount of gypsum in the formulations with suitable increase of the amount of added foam so as to obtain the desired weights of the casts comprising the test specimens.

Also from the foregoing it should be understood that the only one of the casts made without guar gum, which would be suitable as a core for gypsum wallboard, is that for the highest core density of the tabulation, the density for ½" board weighing about 2150 lbs. per thousand square feet.

As has been previously referred to, the compositions of test specimens of lower densities would not be suitab'e for gypsum wallboard made according to present usual manufacturing processes, since these compositions cast as the cores of such boards would result in splitters. These tabulated figures below do, however, show that in compression the lighter weight ½" board incorporating guar gum in the amout of ½% will be of substantially the same strength as the heavier ½" board not incorporating the guar gum, or that inclusion of the guar gum in board of the present usual production weight will increase compressive strength about 50%.

[Compressive strength, lbs. per square inch]

| ½" Board, Lbs. Per Sq. Ft. | Equivalent Core Density | Core Strength With Foam, Lbs. per Sq. In. | |
|---|---|---|---|
| | | 0% Guar Gum | 0.5% Guar Gum |
| 1,300 | 30.2 | 175 | 325 |
| 1,600 | 38.2 | 310 | 600 |
| 1,850 | 44.7 | 590 | 975 |
| 2,150 | 52.6 | 1,025 | 1,500 |

From the foregoing it should be readily apparent that there has been disclosed and fully described procedures for the production of gypsum wallboard of appreciably lower weight per thousand square feet than board heretofore produced, wherein the limiting factor has been in that the addition of a greater amount of foam than usual, in order to reduce board weight, has resulted in splitters, that is, the cover sheets are not properly adhered to the core. Utilizing the inventions hereof, however, gypsum wallboards of lower than present commercial weights can be produced with perfect bond between the cover sheets and cores, and due to the increased strength of the core of the new and novel formulation hereof, make it possible to produce gypsum wallboards of appreciably lower weight than heretofore without undue reduction of strength.

In the foregoing there has not been any discussion of the addition of the gum in excess of substantially 0.5%. It is not to be understood that a greater amount of gum cannot be used in the composition, say, to 1, 2, 3 or even 5%, but economically the use of such additional gum in the composition would be unsound. The addition of ½% gum is sufficient to produce just about as light a board as is commercially practical, but it is to be understood, however, that in special circumstances, if it is desired to produce board lighter than those specifically described, a greater percentage of the gum ingredient may be added, but in this connection about 2% is believed to be the upper limit of the amount which would be at all effective.

Due to the fact that very little ¾" gypsum wallboard has been made, this thickness has not been referred to above. Three-quarter inch board has been made according to the inventions hereof and according to the general formulation as has been set out, using 0.25% gum and resulting in a board of about 2000 lbs. per thousand square feet, and with 0.5% gum resulting in a board of about 1700 lbs. per thousand square feet. These light weight boards just referred to, it will be seen, are appreciably lighter than the so-called regular commercial cellular gypsum wallboard for which the industry average is around 3100 lbs. per thousand square feet.

In the foregoing there has been discussed only those compositions incorporating Guar gum and locust bean gum. There are, of course, other galactomannans which may function similarly, as, for example, tara, flame tree, honey locust, palo verde, and the like, but such not being available in quantity which would warrant the consideration of their use in commercial production of gypsum wallboard, the suitability of these materials for use in the compositions as described has not been investigated.

The inventions hereof having been disclosed and the use thereof described in detail, I claim:

1. Gypsum wallboard comprising cover sheets bonded to a cellular gypsum core, the cellular gypsum core including therein a content of 0.2% to 3% of fibrous material by weight, 0.5% to 2% by weight of starch, 8 to 14 cubic feet of foam and guar gum in the amount in excess of about 0.125% thereof by weight but not exceeding 1% thereof by weight the wallboard in ½" thickness having the weight of about 1850 to 1300 pounds per 1000 square feet, surface measure.

2. Gypsum wallboard comprising cover sheets bonded to a cellular gypsum core, the cellular gypsum core including therein a content of 0.2% to 3% of fibrous material by weight, 0.5% to 2% by weight of starch, 8 to 14 cubic feet of foam and a galactomannan of the group consisting of guar gum and a cooked locust bean gum present in the amount of between about 0.25 to 0.5% of the core weight the wallboard in ½" thickness having the weight of about 1850 to 1300 pounds per 1000 square feet, surface measure.

3. The light weight gypsum cast comprising the set mass resulting from admixture with water, the composition comprising substantially, calcined gypsum starch, foam and guar gum in the amount of between about 0.125 to 1% based on the weight of calcined gypsum the gypsum cast having the weight of about 30 to 45 pounds per cubic foot.

4. The light weight gypsum cast comprising the mass resulting from the admixture of water with other ingredients in the proportions of about 1000 pounds calcined stucco, about 10 pounds paper fiber, about 8 pounds starch, 4 pounds accelerator, about 11 cubic feet of foam, and about 4 pounds guar gum the gypsum cast having the weight of between about 30 to 45 pounds per cubic foot.

5. The method of forming a light weight gypsum cast of a density of between about 30 to 45 pounds per cubic foot comprising the steps, admixing with the water ingredients in the approximate proportions of about 1000 pounds of calcined gypsum, about 8 pounds of starch, about 11 cubic feet of stable foam, and about 0.25 to 1% guar gum.

6. A light weight gypsum board for ½" wallboard comprising a light weight cellular gypsum composition and paper facing sheets securely bonded to the major faces of such core, the core comprising the set resultant of an admixture of hydrating water with other ingredients in substantially the proportions of approximately gypsum stucco 1000 pounds, paper fiber 10 pounds, starch 8 pounds, stable foam 11 cubic feet, and guar gum 4 pounds the resulting wallboard weighing between about 1300 to 1550 pounds per 1000 square feet, surface measure.

7. A light weight gypsum board comprising a light weight cellular gypsum composition and paper facing sheets securely bonded to the major faces of such core, the core comprising the set resultant of an admixture of hydrating water with other ingredients in substantially the proportions of approximately gypsum stucco 1000 pounds, textile glass fiber of about ½" length 1 pound, starch 8 pounds, stable foam 11 cubic feet, and guar gum 4 pounds the resulting wallboard, for ½" thickness weighing about 1550 pounds per 1000 square feet, surface measure.

8. A light weight gypsum board comprising a light weight cellular gypsum composition and paper facing sheets securely bonded to the major faces of such core, the core comprising the set resultant of an admixture of hydrating water with other ingredients in substantially the proportions of approximately gypsum stucco 1000 pounds, paper fiber 10 pounds, starch 8 pounds, stable foam 11 cubic feet and cooked locust bean gum 1 pound the resulting wallboard weighing about 1800 pounds per 1000 square feet, surface measure.

9. A light weight gypsum board comprising a light weight cellular gypsum composition and paper facing sheets securely bonded to the major faces of such core, the core comprising the set resultant of an admixture of hydrating water with other ingredients in substantially the proportions of approximately gypsum stucco 1000 pounds, paper fiber 10 pounds, starch 8 ponnds, stable foam 11 cubic feet and a galactomannan of the group consisting of guar gum and cooked locust bean gum 4 pounds the resulting wallboard for ½" thickness weighing between about 1300 to 1550 pounds per 1000 square feet, surface measure.

10. A light weight gypsum board for board of ½" thickness comprising a light weight cellular gypsum composition and paper facing sheets securely bonded to the major faces of such core, the core comprising the set resultant of an admixture of hydrating water with other ingredients in substantially the proportions of approximately gypsum stucco 1000 pounds, paper fiber 10 pounds, starch 8 pounds, a sodium salt of alkylated aromatic hydrocarbon 1 pound, and guar gum 4 pounds the resulting wallboard weighing between about 1300 to 1550 pounds per 1000 square feet, surface measure.

11. A gypsum wallboard comprising a light weight cellular core and paper face sheets bonded thereto, the cellular gypsum core comprising the set hydrated product of an admixture of water, gypsum stucco, about 8 pounds of starch per thousand pounds of stucco, and, based on the weight of stucco, guar gum in the amount of between about 0.25 and 0.5 percent, and incorporated therein per 1000 pounds of stucco between about 8 to 14 cubic feet of air cells predominantly of small size and uniform dispersion throughout the gypsum matrix the wallboard in ½" thickness having the weight of about 1850 to 1300 pounds per 1000 square feet, surface measure.

References Cited in the file of this patent

UNITED STATES PATENTS

| | | |
|---|---|---|
| 2,044,401 | Roos | June 16, 1936 |
| 2,200,155 | Camp et al. | May 7, 1940 |
| 2,207,339 | Camp | July 9, 1940 |
| 2,483,936 | Roberts | Oct. 4, 1949 |
| 2,485,259 | Chrisler | Oct. 18, 1949 |
| 2,644,750 | Frisch et al. | July 7, 1953 |
| 2,744,022 | Croce et al. | May 1, 1956 |
| 2,803,575 | Riddell et al. | Aug. 20, 1957 |

OTHER REFERENCES

Paper Trade Journal, pp. 38, 40; Dec. 20, 1945; The Institute Report on Guar.